(12) United States Patent
Takahashi

(10) Patent No.: US 12,444,949 B2
(45) Date of Patent: Oct. 14, 2025

(54) SERVER AND POWER MANAGEMENT SYSTEM FOR PRIORITIZING DEMAND RESPONSE VEHICLES USED FOR INCREASING POWER DEMAND

(71) Applicant: TOYOTA JIDOSHA KABUSHIKI KAISHA, Toyota (JP)

(72) Inventor: Tomoya Takahashi, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 431 days.

(21) Appl. No.: 18/054,975

(22) Filed: Nov. 14, 2022

(65) Prior Publication Data

US 2023/0231387 A1 Jul. 20, 2023

(30) Foreign Application Priority Data

Jan. 19, 2022 (JP) .................................. 2022-006372

(51) Int. Cl.
*H02J 3/32* (2006.01)
*H02J 3/00* (2006.01)
*H02J 3/14* (2006.01)

(52) U.S. Cl.
CPC .............. *H02J 3/322* (2020.01); *H02J 3/003* (2020.01); *H02J 3/144* (2020.01)

(58) Field of Classification Search
CPC .. H02J 3/322; H02J 3/003; H02J 3/144; H02J 2310/48; H02J 7/0013; Y02T 10/70; Y02T 10/7072; Y02T 90/12; Y02T 90/167; B60L 53/63; B60L 53/60; B60L 53/66; B60L 53/67; B60L 2240/70; B60L 2240/80
See application file for complete search history.

(56) References Cited

U.S. PATENT DOCUMENTS

| | | | |
|---|---|---|---|
| 2010/0138065 A1* | 6/2010 | Taft .......................... | H02J 3/144 703/2 |
| 2013/0229149 A1* | 9/2013 | Sortomme .............. | B60L 53/00 320/109 |
| 2014/0354227 A1* | 12/2014 | Tyagi ...................... | B60L 53/63 320/109 |
| 2016/0075247 A1* | 3/2016 | Uyeki ....................... | H02J 3/00 455/456.3 |
| 2016/0336626 A1* | 11/2016 | Kawauchi ............. | H02J 7/0032 |
| 2017/0210311 A1* | 7/2017 | Shiraishi ................ | B60R 16/04 |
| 2018/0331539 A1* | 11/2018 | Lee ........................ | H02J 3/14 |
| 2019/0103629 A1* | 4/2019 | Koike .................... | H01M 10/12 |
| 2019/0229541 A1* | 7/2019 | Ono ........................ | B60L 58/19 |
| 2019/0359065 A1* | 11/2019 | Al-Awami .............. | H02J 3/322 |

(Continued)

FOREIGN PATENT DOCUMENTS

JP 2012-050222 A 3/2012

*Primary Examiner* — Rami R Okasha
(74) *Attorney, Agent, or Firm* — Finnegan, Henderson, Farabow, Garrett, and Dunner, LLP

(57) ABSTRACT

A server includes a processing device. The server manages a plurality of vehicles. The processing device sets priority levels for the vehicles. The processing device sets the priority level of a vehicle in which its switching device is in a closed state to be higher than the priority level of a vehicle in which its switching device is in an open state. The processing device selects, based on the priority levels, a participating vehicle to be used for demand-increasing demand response from among the vehicles.

10 Claims, 9 Drawing Sheets

| VEHICLE ID (35) | SMR INFORMATION (362) | CHARGING RELAY INFORMATION (363) | DR AMOUNT (38) | PRIORITY LEVEL p (39) | PREDETERMINED CONDITION (41) | ... |
|---|---|---|---|---|---|---|
| 001 | CLOSED (ON) | CLOSED (ON) | a | pa | NOT SATISFIED | ... |
| 002 | CLOSED (ON) | CLOSED (ON) | b | pb | NOT SATISFIED | ... |
| 003 | CLOSED (ON) | CLOSED (ON) | c | pc (= 0) | SATISFIED (EXCLUDED) | ... |
| 004 | OPEN (OFF) | OPEN (OFF) | d | pd | NOT SATISFIED | ... |
| : | : | : | : | : | | |

(56) References Cited

U.S. PATENT DOCUMENTS

| | | | |
|---|---|---|---|
| 2020/0231056 A1* | 7/2020 | Sadano | B60L 53/62 |
| 2020/0231058 A1* | 7/2020 | Hishida | B60L 55/00 |
| 2021/0061123 A1* | 3/2021 | Suzuki | H01M 10/425 |
| 2023/0187719 A1* | 6/2023 | Nakamura | H01M 10/05 |
| | | | 429/91 |
| 2023/0398897 A1* | 12/2023 | Kaneda | B60L 3/0046 |

* cited by examiner

| VEHICLE ID | SMR INFORMATION | CHARGING RELAY INFORMATION | DR AMOUNT | PRIORITY LEVEL p | ... |
|---|---|---|---|---|---|
| 001(50A) | CLOSED (ON) | CLOSED (ON) | a | pa | ... |
| 002(50A) | CLOSED (ON) | CLOSED (ON) | b | pb | ... |
| 003(50A) | CLOSED (ON) | CLOSED (ON) | c | pc | ... |
| 004(50B) | OPEN (OFF) | OPEN (OFF) | d | pd | ... |
| ⋮ | ⋮ | ⋮ | ⋮ | ⋮ | |

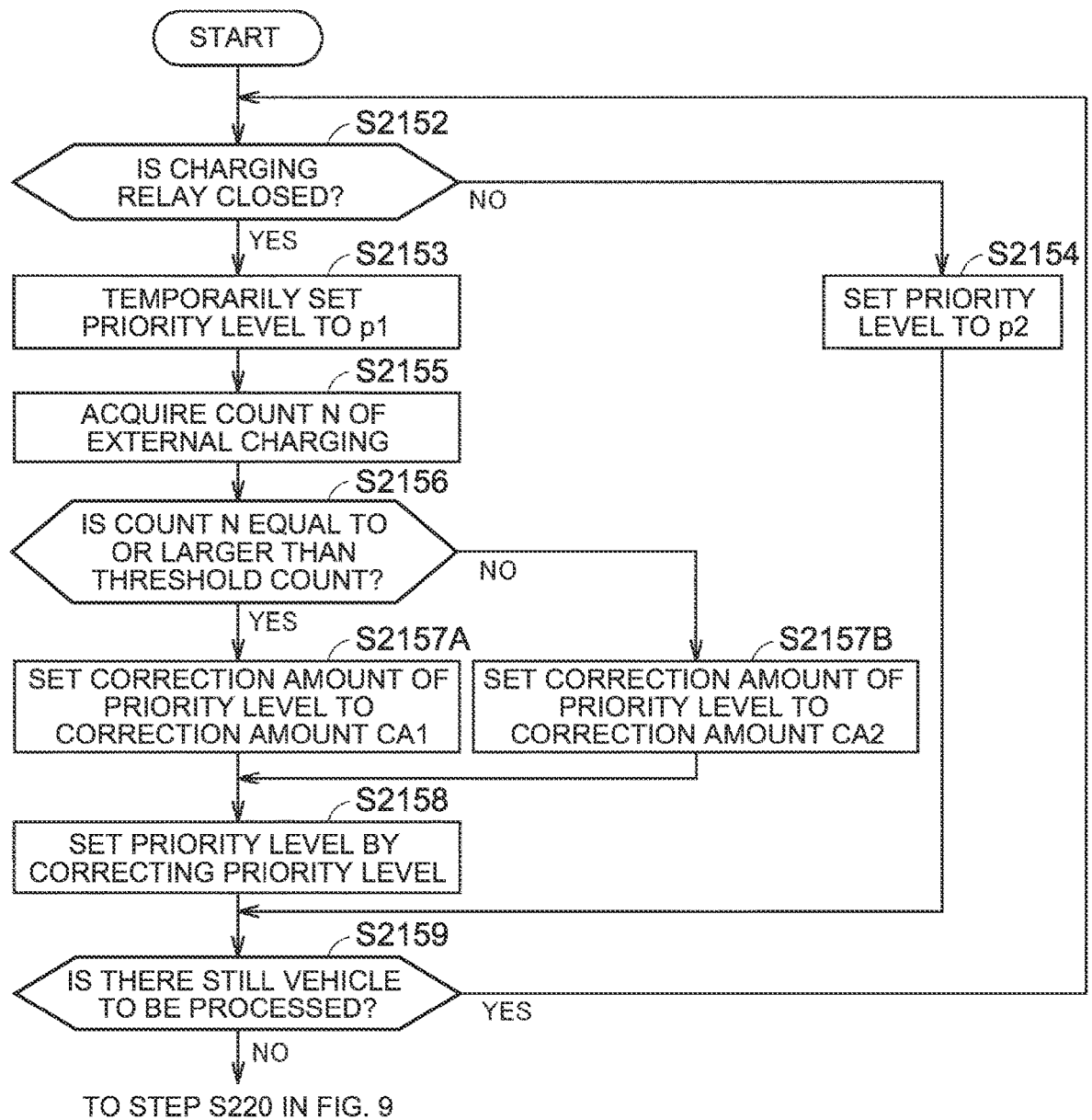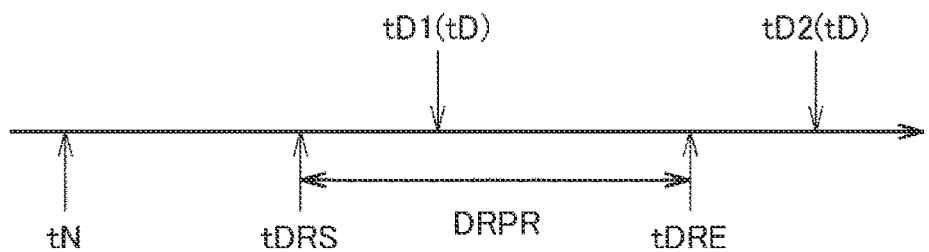

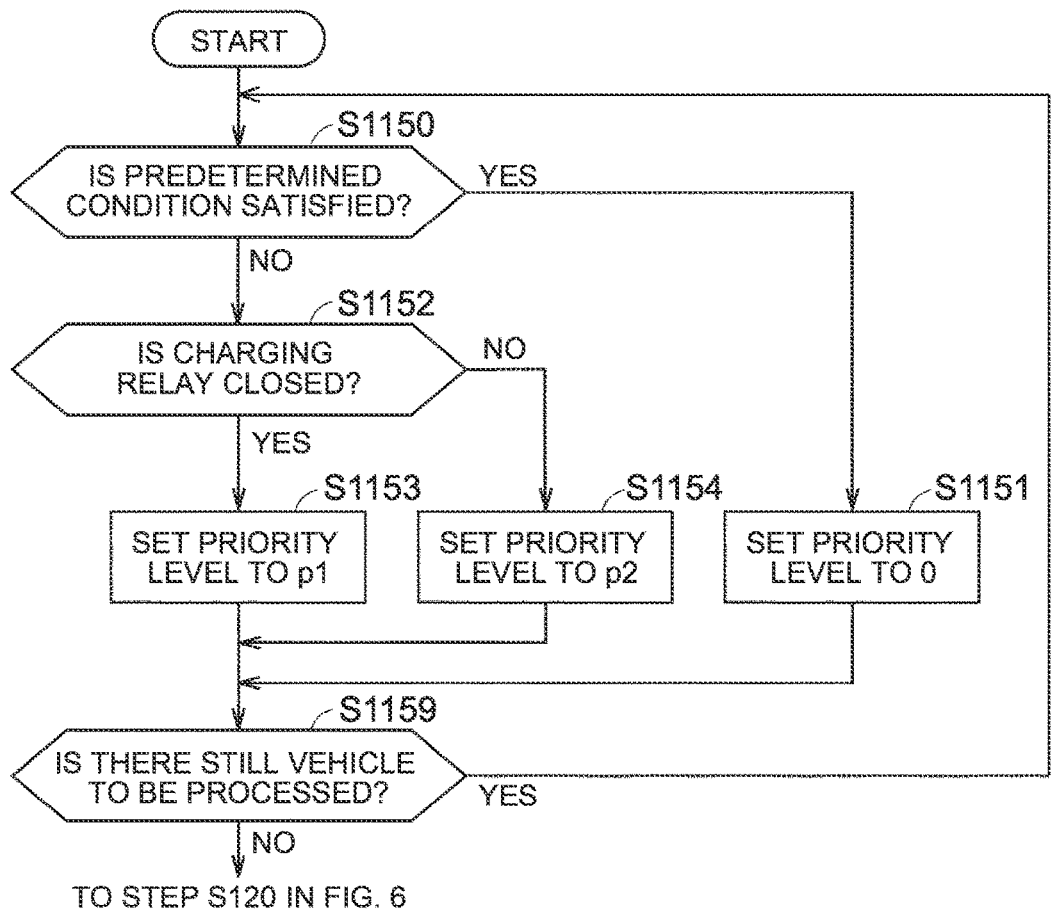

SERVER AND POWER MANAGEMENT SYSTEM FOR PRIORITIZING DEMAND RESPONSE VEHICLES USED FOR INCREASING POWER DEMAND

CROSS-REFERENCE TO RELATED APPLICATION

This application claims priority to Japanese Patent Application No. 2022-006372 filed on Jan. 19, 2022, incorporated herein by reference in its entirety.

BACKGROUND

1. Technical Field

The present disclosure relates to a server and a power management system.

2. Description of Related Art

Japanese Unexamined Patent Application Publication No. 2012-50222 (JP 2012-50222 A) discloses a plurality of vehicles each including a power storage device.

SUMMARY

In the field of virtual power plants (VPPs), research has been conducted into demand response (DR) for adjusting a power supply and demand balance in a power grid. Demand-increasing DR is known as an example of the DR. The demand-increasing DR is a system for requesting power resources to increase a power load (in other words, increase power demand) in the power grid.

A vehicle including a power storage device may be used as a power resource. Such a vehicle may include a switching device that switches electrical connection between the power storage device and the power grid. The vehicle can be used for the demand-increasing DR by receiving electric power from the power grid through a power receiving device when the switching device is closed. Such a switching device is worn more as it is switched more frequently.

The present disclosure provides a server that contributes to adjusting a power supply and demand balance while suppressing wear of a switching device of a vehicle.

The present disclosure also provides a power management system that contributes to adjusting the power supply and demand balance while suppressing the wear of the switching device of the vehicle.

A server according to a first aspect of the present disclosure is configured to manage a plurality of vehicles. Each of the vehicles includes a power storage device and a switching device openable and closable to switch electrical connection between the power storage device and a power grid. Each of the vehicles is configured to receive electric power from the power grid through power equipment outside the vehicle when the switching device is in a closed state. The server includes a processing device. The processing device is configured to set priority levels for the vehicles. The processing device is configured to set a priority level of a first vehicle in which the switching device is in the closed state among the vehicles to be higher than a priority level of a second vehicle in which the switching device is in an open state among the vehicles. The processing device is configured to select, based on the priority levels, a participating vehicle to be used for demand-increasing demand response for increasing a power load in the power grid from among the vehicles.

The power storage device of the participating vehicle is requested to establish electrical connection to the power grid during a period in which the demand-increasing DR is implemented. Therefore, the switching device of the participating vehicle is requested to be controlled in the closed state. When the first vehicle is used for the demand-increasing DR, the switching device of the first vehicle is kept in the closed state and need not be switched. Thus, the switching device of the first vehicle is not worn. When the second vehicle is used for the demand-increasing DR, the switching device of the second vehicle is requested to be switched from the open state to the closed state. Thus, the switching device of the second vehicle may be worn. According to the above configuration, the first vehicle is selected as the participating vehicle with priority over the second vehicle. Therefore, the first vehicle is more likely to be used for the demand-increasing DR than the second vehicle. Thus, in the vehicles, the number of vehicles (first vehicles) in which the open/close state of the switching device is kept when used for the demand-increasing DR increases, and the number of vehicles (second vehicles) in which the open/close state of the switching device is switched decreases. As a result, it is possible to contribute to adjusting the power supply and demand balance while suppressing the wear of the switching device of the vehicle.

The server according to the first aspect may be configured to transmit, to the selected participating vehicle, a signal for notification that the vehicle has been selected as the participating vehicle.

In the server according to the first aspect, the processing device may be configured to set the priority levels based on a history of a duration of the switching device for each of a plurality of the first vehicles. The duration is a period during which the switching device remains in the closed state.

The history of the duration reflects the frequency of switching of the open/close state of the switching device. According to the above configuration, the history of the duration of each of the first vehicles is reflected in the priority level. Therefore, the frequency of switching of the open/close state of the switching device is reflected in the priority level for each of the first vehicles. As a result, the participating vehicle can appropriately be selected from the viewpoint of suppressing the wear of the switching device.

In the server according to the first aspect, each of the vehicles may be configured to perform external charging in which the power storage device is charged with the electric power received through the power equipment.

The history of the duration may include an index value indicating a frequency of the external charging. The processing device may be configured to set a priority level of a third vehicle in which the index value is high among the first vehicles to be higher than a priority level of a fourth vehicle in which the index value is low among the first vehicles.

The switching device of the third vehicle having the high index value is controlled in the closed state more frequently than the switching device of the fourth vehicle having the low index value. Therefore, the switching device of the third vehicle is likely to be switched more frequently than the switching device of the fourth vehicle. Thus, it is conceivable that the switching device of the third vehicle is likely to be worn. According to the above configuration, the third vehicle is selected as the participating vehicle with priority over the fourth vehicle. Therefore, the third vehicle is more likely to be used for the demand-increasing DR than the fourth vehicle. During a period in which the third vehicle is used for the demand-increasing DR, the switching device of the third vehicle is kept in the closed state. As a result, the situation in which the switching device of the third vehicle is switched during this period is avoided. Therefore, it is possible to suppress the wear of the switching device of the third vehicle that may be more likely to be switched than the switching device of the fourth vehicle.

In the server according to the first aspect, the processing device may be configured to select an excluded vehicle to be excluded from the participating vehicle after the participating vehicle has been selected from among the vehicles.

The processing device may be configured to select the fourth vehicle as the excluded vehicle with priority over the third vehicle among the first vehicles.

The switching device of the third vehicle is likely to be switched more frequently than the switching device of the fourth vehicle. Thus, it is conceivable that the switching device of the third vehicle is likely to be worn. According to the above configuration, the fourth vehicle is excluded from the participating vehicle with priority over the third vehicle, while the third vehicle is less likely to be excluded from the participating vehicle than the fourth vehicle. During the period in which the third vehicle is used for the demand-increasing DR, the switching device of the third vehicle is kept in the closed state. As a result, the situation in which the switching device of the third vehicle is switched during this period is avoided. Therefore, it is possible to suppress the wear of the switching device of the third vehicle.

In the server according to the first aspect, each of the vehicles may be configured to perform external charging in which the power storage device is charged with the electric power received through the power equipment.

The history of the duration may include a participation frequency index value indicating a frequency of use of each of the vehicles for the demand-increasing demand response. The processing device may be configured to set a priority level of a fifth vehicle in which the participation frequency index value is high among the first vehicles to be lower than a priority level of a sixth vehicle in which the participation frequency index value is low among the first vehicles.

When the priority level of the fifth vehicle is set lower than the priority level of the sixth vehicle, the fifth vehicle is less likely to be selected as the participating vehicle than the sixth vehicle. Therefore, the fifth vehicle is less likely to be used for the demand-increasing DR than the sixth vehicle. When the fifth vehicle is not used for the demand-increasing DR, the current caused by the use of the fifth vehicle for the demand-increasing DR does not flow through the switching device unlike the case where the fifth vehicle is used for the demand-increasing DR. Therefore, when the priority levels are set as described above, the further wear of the switching device of the fifth vehicle can be suppressed.

In the server according to the first aspect, each of the vehicles may be configured to perform external charging in which the power storage device is charged with the electric power received through the power equipment.

The processing device may be configured to set a priority level of a seventh vehicle that satisfies a predetermined condition among the vehicles to exclude the seventh vehicle from candidates for the participating vehicle.

The predetermined condition may include a condition that a scheduled departure time of the seventh vehicle is within a period during which the demand-increasing demand response is implemented.

If the seventh vehicle is selected as the participating vehicle in a case where the scheduled departure time of the vehicle is within the DR implementation period, the seventh vehicle is requested for use in the demand-increasing DR over the above period. Therefore, there is a possibility that the seventh vehicle cannot depart at the scheduled departure time. According to the above configuration, the situation in which the seventh vehicle is selected as the participating vehicle is avoided. As a result, it is possible to reduce the occurrence of the case where the seventh vehicle cannot depart at the scheduled departure time. Thus, it is possible to suppress the wear of the switching device and adjust the power supply and demand balance without causing any inconvenience to the user of the seventh vehicle.

In the server according to the first aspect, each of the vehicles may be configured to perform external charging in which the power storage device is charged with the electric power received through the power equipment.

The processing device may be configured to set a priority level of an eighth vehicle that satisfies a predetermined condition among the vehicles to exclude the eighth vehicle from candidates for the participating vehicle.

The predetermined condition may include a condition that a switching count of the switching device of the eighth vehicle in a predetermined period is equal to or larger than a predetermined switching count.

A power management system according to a second aspect of the present disclosure includes a plurality of vehicles and a server configured to manage the vehicles. Each of the vehicles includes a power storage device and a switching device openable and closable to switch electrical connection between the power storage device and a power grid. Each of the vehicles is configured to receive electric power from the power grid through power equipment outside the vehicle when the switching device is in a closed state. The server includes a processing device. The processing device is configured to set priority levels for the vehicles. The processing device is configured to set a priority level of a first vehicle in which the switching device is in the closed state among the vehicles to be higher than a priority level of a second vehicle in which the switching device is in an open state among the vehicles. The processing device is configured to select, based on the priority levels, a participating vehicle to be used for demand-increasing demand response for increasing a power load in the power grid from among the vehicles.

In the power management system according to the second aspect, each of the vehicles may be configured to, out of external discharging in which electric power stored in the power storage device is discharged to the power grid through the power equipment and external charging in which the power storage device is charged with the electric power received through the power equipment, perform the external charging alone.

According to such a configuration, it is possible to suppress the wear of the switching device and adjust the power supply and demand balance while simplifying the configuration and control of the vehicle.

According to the present disclosure, it is possible to contribute to adjusting the power supply and demand balance while suppressing the wear of the switching device of the vehicle when the vehicle is used as a power resource.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a flowchart showing details of a priority level setting process (Step S215 in FIG. 9);

FIG. 11 is a diagram for explaining that user's inconvenience is caused when a scheduled departure time of the vehicle is within a demand-increasing DR implementation period;

FIG. 12 is a diagram showing another example of the vehicle management data stored in the storage device; and FIG. 13 is a flowchart showing details of another example of the priority level setting process (Step S115 in FIG. 6).

DETAILED DESCRIPTION OF EMBODIMENTS

Figure 1:
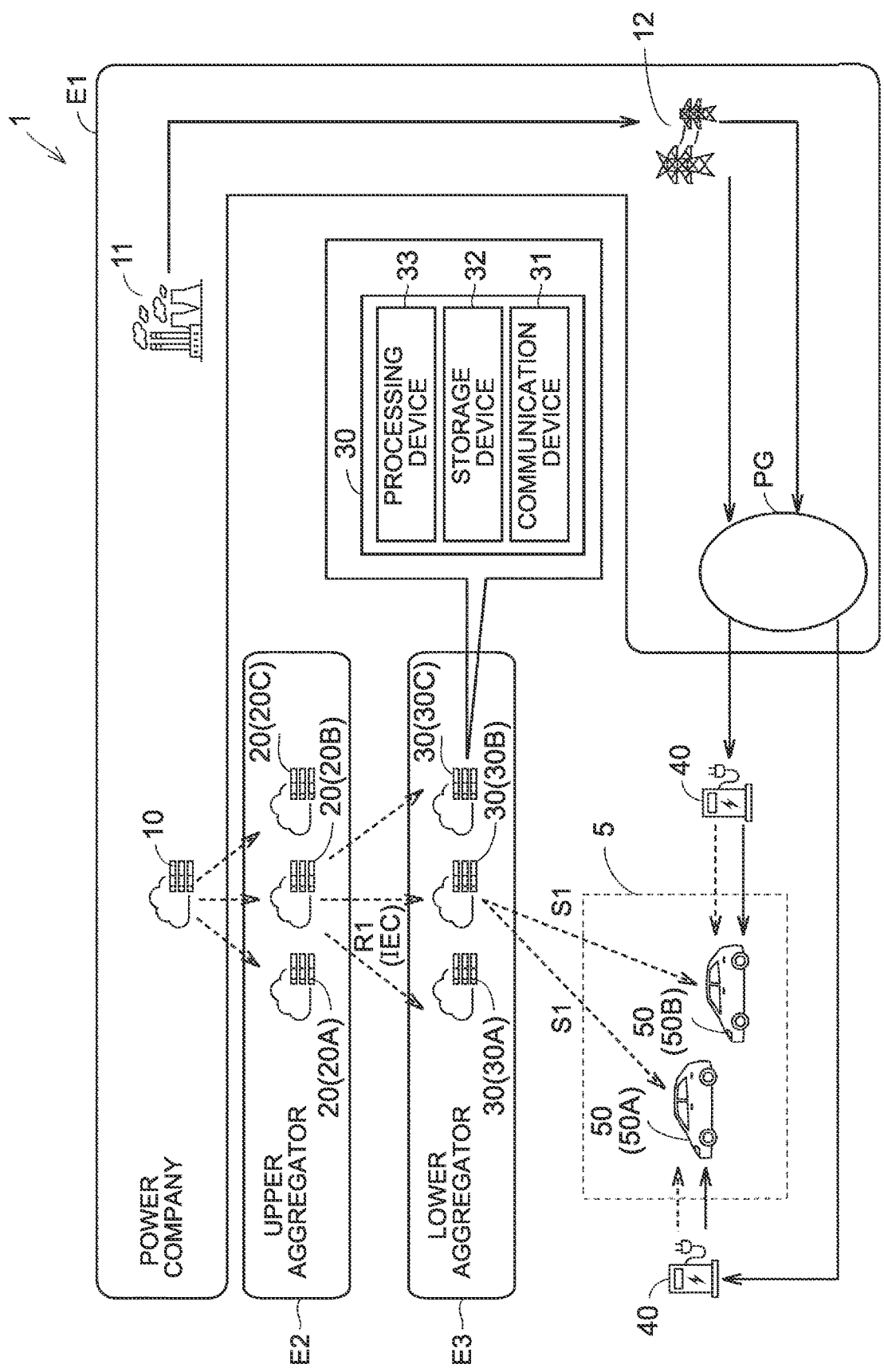
FIG. 1 is a diagram showing the configuration of a power management system according to a first embodiment.

Hereinafter, embodiments of the present disclosure will be described in detail with reference to the drawings. In the drawings, the same or corresponding parts are denoted by the same reference signs and the description thereof will not be repeated.

First Embodiment

FIG. 1 is a diagram showing the configuration of a power management system according to a first embodiment. Referring to FIG. 1, a power management system 1 includes a server 10 of a power company E1, servers 20 of an upper aggregator E2, servers 30 of a lower aggregator E3, a plurality of pieces of power equipment 40, and a vehicle group 5. Hereinafter, each business operator belonging to the upper aggregator E2 is also referred to as "parent aggregator (parent AG)". Each business operator belonging to the lower aggregator E3 is also referred to as "child AG".

The power company E1 includes the server 10, a power plant 11, power transmission and distribution equipment 12, and a power grid PG.

The server 10 is operated by the power company E1. The server 10 manages a plurality of parent AGs under the management of the power company E1 (for example, parent AGs registered in the server 10) by using pieces of identification information (IDs) assigned to the parent AGs.

The power plant 11 includes a power generator and supplies electric power generated by the power generator to the power transmission and distribution equipment 12. The power generation method of the power plant 11 may be any method such as thermal power generation, hydroelectric power generation, wind power generation, nuclear power generation, or solar power generation.

The power transmission and distribution equipment 12 includes transmission lines, substations, and distribution lines. The power transmission and distribution equipment 12 supplies electric power supplied from the power plant 11 to the power grid PG.

The upper aggregator E2 operates the servers 20 (for example, servers 20A to 20C) provided for the parent AGs. Hereinafter, the term "server 20" means each server of the upper aggregator E2 without distinction. Each server 20 manages a plurality of child AGs under the management of the parent AG (for example, child AGs registered in the server 20) by using IDs assigned to the child AGs. The parent AG of the upper aggregator E2 provides an energy management service to the power company E1 by aggregating electric energies controlled by the child AGs under the management of the parent AG.

The lower aggregator E3 operates the servers 30 (for example, servers 30A to 30C) provided for the child AGs. Hereinafter, the term "server 30" means each server of the lower aggregator E3 without distinction. The servers 30 are managed by a common server 20 (for example, the server 20B).

The server 30 manages a plurality of power resources under the management of the child AG (vehicles 50 in this example) by using IDs assigned to the power resources. The server 30 includes a communication device 31, a storage device 32, and a processing device 33.

The communication device 31 communicates with external devices (for example, the server 20 and the vehicle 50). The communication device 31 receives a request R1 from the server 20 of the parent AG.

The request R1 is a signal for requesting the server 30 of the child AG to increase a power consumption in the power grid PG by aggregating the power resources. The request R1 includes information IEC indicating a target power consumption requested in the power grid PG while demand-increasing DR is implemented.

The communication device 31 transmits a demand-increasing DR signal S1 to the vehicle 50 serving as the power resource in response to the reception of the request R1. The demand-increasing DR signal S1 requests the vehicle 50 to increase a power load in the power grid PG. That is, the demand-increasing DR signal S1 requests the vehicle to perform control for the demand-increasing DR.

The storage device 32 includes memories such as a read only memory (ROM) and a random access memory (RAM). The ROM stores programs to be executed by the processing device 33. The RAM functions as a working memory for processes to be executed by the processing device 33.

The processing device 33 includes a processor such as a central processing unit (CPU). The processing device 33 executes various processes by executing the programs stored in the storage device 32.

The vehicle group 5 includes a plurality of vehicles 50. In this example, two vehicles 50 are shown for simplification of the description, but the vehicle group 5 may further include other vehicles 50.

The vehicle 50 is electrically connected to the power equipment 40 (described later). The vehicle 50 is a battery electric vehicle (BEV) including a power storage device and a charging relay. A user of the vehicle 50 has made a contract in advance with the child AG of the lower aggregator E3 so that the vehicle 50 can be used for the demand-increasing DR.

Hereinafter, the vehicle 50 whose charging relay is closed is also referred to as "vehicle 50A". The vehicle 50 whose charging relay is open is also referred to as "vehicle 50B".

In this example, one vehicle 50A and one vehicle 50B are shown in the vehicle group 5 for simplification of the description. The vehicle group 5 may include a plurality of vehicles 50A and a plurality of vehicles 50B.

The vehicle 50 can perform external charging in which the power storage device is charged with electric power supplied through the power equipment 40 outside the vehicle 50. When the vehicle 50A performs the external charging, the charging relay of the vehicle 50A is kept closed. When the vehicle 50B performs the external charging, the charging relay is switched from the open state to the closed state. A detailed configuration of the vehicle 50 will be described in detail later.

The vehicle 50 does not perform external discharging in which electric power stored in the power storage device is discharged to the power grid PG through the power equipment 40. That is, the vehicle 50 is a V1G vehicle configured to perform only the external charging out of the external charging and the external discharging.

When the vehicle 50 performs the external charging, electric power is supplied to the vehicle 50 from the power grid PG through the power equipment 40. This increases the power load in the power grid PG. Thus, each vehicle 50 can be used for the demand-increasing DR by performing the external charging. Hereinafter, the vehicle 50 used for the demand-increasing DR among the vehicles 50 in the vehicle group 5 is also referred to as "participating vehicle". The use of the vehicle 50 for the DR means that the vehicle 50 is controlled to receive electric power from the power grid PG through the power equipment 40.

Figure 2:
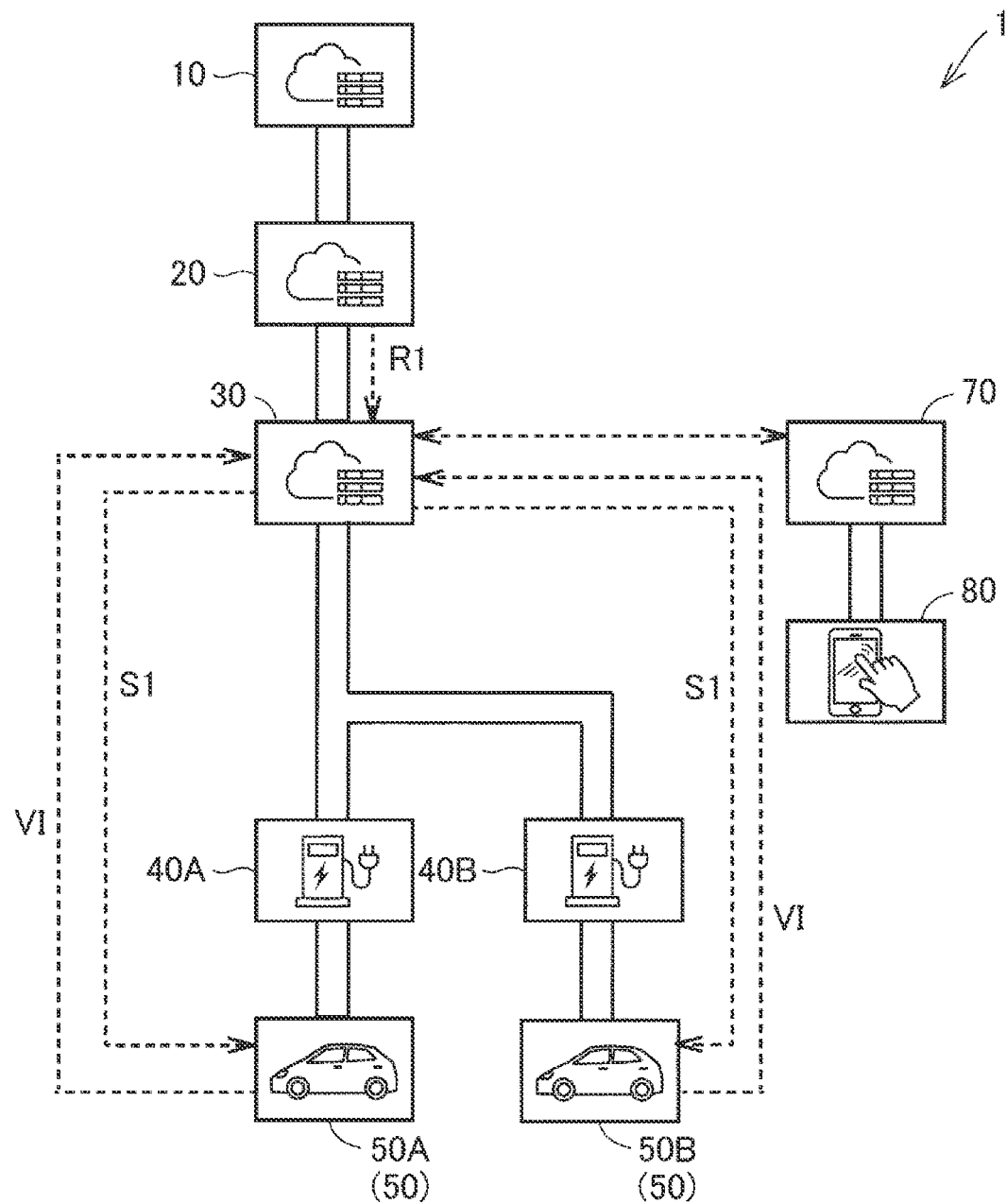
FIG. 2 is a communication system diagram of the power management system.

The power equipment 40 is connected to the power grid PG. The power equipment 40 supplies electric power from the power grid PG to the vehicle 50. In this example, the power equipment 40 is contact power equipment (power stand) that supplies electric power to the vehicle 50 through a charging cable and its connector. The power equipment 40 may be non-contact power equipment that supplies electric power to the vehicle 50 in a non-contact manner FIG. 2 is a communication system diagram of the power management system 1. Referring to FIG. 2, the power management system 1 further includes a data center 70 and a mobile terminal 80.

The data center 70 communicates with the server 30, for example, via the Internet. The data center 70 manages information on a plurality of mobile terminals (for example, smart phones) 80. The information on the mobile terminal 80 is registered in the data center 70 and includes information on the vehicle 50 of the user who owns the mobile terminal 80. This information includes, for example, a vehicle ID of the vehicle 50 and a travel schedule of the vehicle 50 including a scheduled departure time of the vehicle 50. The information registered in the data center 70 is transmitted to the server 30.

The server 10 of the power company E1 adjusts a power supply and demand balance by using the demand-increasing DR. For such adjustment, the server 10 first transmits a signal to each server 20 to request the parent AG to participate in the demand-increasing DR. This signal includes an area subject to the demand-increasing DR and a period during which the demand-increasing DR is implemented (demand-increasing DR period).

When the server 20 of the parent AG receives the above signal, the server 20 outputs the request R1 to the server 30 of the child AG.

When the server 30 of the child AG receives the request R1 from the server 20 of the parent AG, the server 30 allocates a DR amount to each vehicle 50 available for the DR among the vehicles 50 under the management of the child AG. In this example, the DR amount is a requested amount of electric power to be received by the vehicle 50 (or the power consumption in the power grid PG). The server 30 transmits the demand-increasing DR signal S1 to each vehicle 50. The demand-increasing DR signal S1 includes the ID of the vehicle 50 to which the signal is transmitted, the DR amount of the vehicle 50, and the demand-increasing DR period. The ID of the vehicle 50, the DR amount, and the demand-increasing DR period may be stored in the storage device 32 of the server 30 as DR information.

When the vehicle 50 receives the demand-increasing DR signal S1, the vehicle 50 transmits vehicle information VI indicating the state of the vehicle 50 to the server 30. The exchange of information between the vehicle 50 and the server 30 will be described later in detail.

Figure 3:
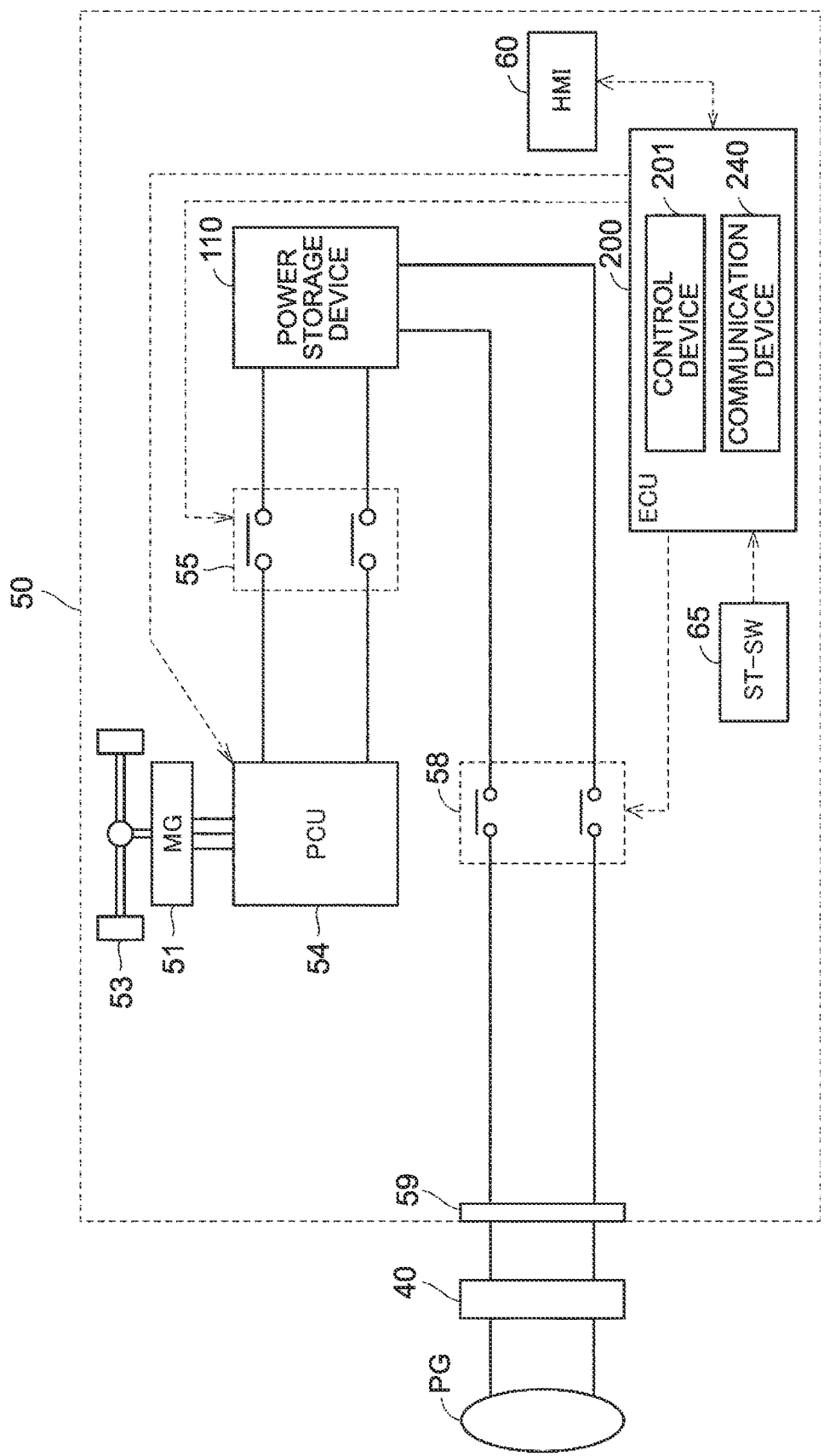
FIG. 3 is a diagram showing details of an example of the configuration of a vehicle.

FIG. 3 is a diagram showing details of an example of the configuration of the vehicle 50. Referring to FIG. 3, the vehicle 50 includes a power storage device 110, a power control unit (PCU) 54, a motor generator (MG) 51, and drive wheels 53. The vehicle 50 further includes a system main relay (SMR) 55, a charging relay 58, an inlet 59, and a human-machine interface (HMI) device 60. The vehicle 50 further includes a start switch 65 and an electronic control unit (ECU) 200.

The power storage device 110 stores electric power for traveling. The power storage device 110 is a secondary battery such as a lithium ion battery or a nickel metal hydride battery. The power storage amount of the power storage device 110 is represented by, for example, a state of charge (SOC).

The PCU 54 converts electric power from the power storage device 110 and outputs the electric power after the conversion to the MG 51.

The MG 51 is, for example, a three-phase alternating current (AC) motor generator. The MG 51 is driven by the PCU 54 to generate a traveling driving force for the vehicle 50. This traveling driving force is transmitted to the drive wheels 53 via a power transmission gear. Thus, the vehicle 50 travels.

The SMR 55 is openable and closable. The SMR 55 is provided between the power storage device 110 and the PCU 54 and switches electrical connection between the power storage device 110 and the PCU 54.

The charging relay 58 is openable and closable. The charging relay 58 is provided between the power storage device 110 and the inlet 59 and switches electrical connection between the vehicle 50 (power storage device 110) and the power grid PG. The charging relay 58 is an example of a "switching device" of the present disclosure.

The inlet 59 receives electric power from the power grid PG through the power equipment 40 when the charging relay 58 is closed. In this case, the power storage device 110 and the power grid PG are electrically connected through the inlet 59 and the power equipment 40. Therefore, the vehicle 50 can perform the external charging. When the charging relay 58 is open, the power storage device 110 and the power grid PG are electrically disconnected. In this case, the external charging of the vehicle 50 is not performed.

The HMI device 60 receives operations from the user of the vehicle 50 and displays various screens. The HMI device 60 is operated to set, for example, a scheduled departure time of the vehicle 50. The HMI device 60 may display a screen for inquiring of the user whether the vehicle 50 can actually be used for the demand-increasing DR during the demand-increasing DR period specified in the demand-increasing DR signal S1. When a user operation indicating whether to use the vehicle 50 for the DR is performed in response to the inquiry, information indicating whether to use the vehicle 50 for the DR is stored in the memory of the ECU 200 as participation permission information.

The start switch 65 is pressed by the user to switch the start and stop of a traveling system (power supply system) of the vehicle 50.

The ECU 200 includes a communication device 240 and a control device 201. The communication device 240 communicates with devices outside the vehicle 50. For example, the communication device 240 receives the demand-increasing DR signal S1 from the server 30 and transmits the vehicle information VI to the server 30. The communication device 240 may be mounted on the vehicle 50 as a component separate from the ECU 200.

The control device 201 includes a processor such as a CPU and a memory (neither shown). The control device 201 controls various devices of the vehicle 50, such as the PCU 54, the MG 51, the SMR 55, the charging relay 58, the HMI device 60, and the communication device 240.

For example, the control device 201 controls the open/close states of the SMR 55 and the charging relay 58. The control device 201 calculates the SOC of the power storage device 110 based on a temperature, a voltage, and a current of the power storage device 110.

The control device 201 controls the external charging of the vehicle 50. For example, the control device 201 outputs a charging start request to the power equipment 40 with the inlet 59 connected to the power equipment 40. Then, the control device 201 controls the charging relay 58 to be closed. As a result, electric power is supplied from the power grid PG to the power storage device 110 of the vehicle 50 through the power equipment 40, thereby performing the external charging. When the SOC of the power storage device 110 reaches a threshold value (for example, full charge SOC) after the start of the external charging, the control device 201 outputs a charging stop request to the power equipment 40 and controls the charging relay 58 to open. Thus, the external charging is finished.

The vehicle 50 can be used for the demand-increasing DR by receiving electric power from the power grid PG through the inlet 59 (by performing the external charging) when the charging relay 58 is closed. The relays such as the charging relay 58 are worn more as they are switched more frequently. Therefore, when the vehicle 50 is used for the demand-increasing DR, the charging relay 58 is more likely to be worn than when the vehicle 50 is not used for the demand-increasing DR because the charging relay 58 is switched more frequently.

The server 30 according to the first embodiment has a configuration for dealing with the above problem. Specifically, the processing device 33 of the server 30 selects the participating vehicle to be used for the demand-increasing DR from among the vehicles 50 in the vehicle group 5 based on priority levels set for the vehicles 50. Among the vehicles 50, the processing device 33 sets the priority level of the vehicle 50A (FIG. 1) whose charging relay 58 is closed to be higher than the priority level of the vehicle 50B whose charging relay 58 is open.

The power storage device 110 of the participating vehicle needs to be electrically connected to the power grid PG during the period in which the demand-increasing DR is implemented. Therefore, the charging relay 58 of the participating vehicle is controlled to be closed. When the vehicle 50A is used for the demand-increasing DR, the charging relay 58 of the vehicle 50A is kept closed. That is, when the vehicle 50A is used for the demand-increasing DR, the charging relay 58 of the vehicle 50A is not switched. Thus, the charging relay 58 of the vehicle 50A is not worn. When the vehicle 50B is used for the demand-increasing DR, the charging relay 58 of the vehicle 50B needs to be switched from the open state to the closed state. Thus, the charging relay 58 of the vehicle 50B may be worn.

When the priority level of the vehicle 50A is set higher than the priority level of the vehicle 50B as described above, the processing device 33 of the server 30 selects the vehicle 50A as the participating vehicle with priority over the vehicle 50B. Therefore, the vehicle 50A is more likely to be used for the demand-increasing DR than the vehicle 50B. Thus, in the vehicles 50 in the vehicle group 5, the number of vehicles 50A in which the open/close state of the charging relay 58 is kept when used for the demand-increasing DR increases, and the number of vehicles 50B in which the open/close state of the charging relay 58 is switched decreases. As a result, it is possible to contribute to adjusting the power supply and demand balance in the power grid PG while suppressing the wear of the charging relay 58 of the vehicle 50.

Figure 4:
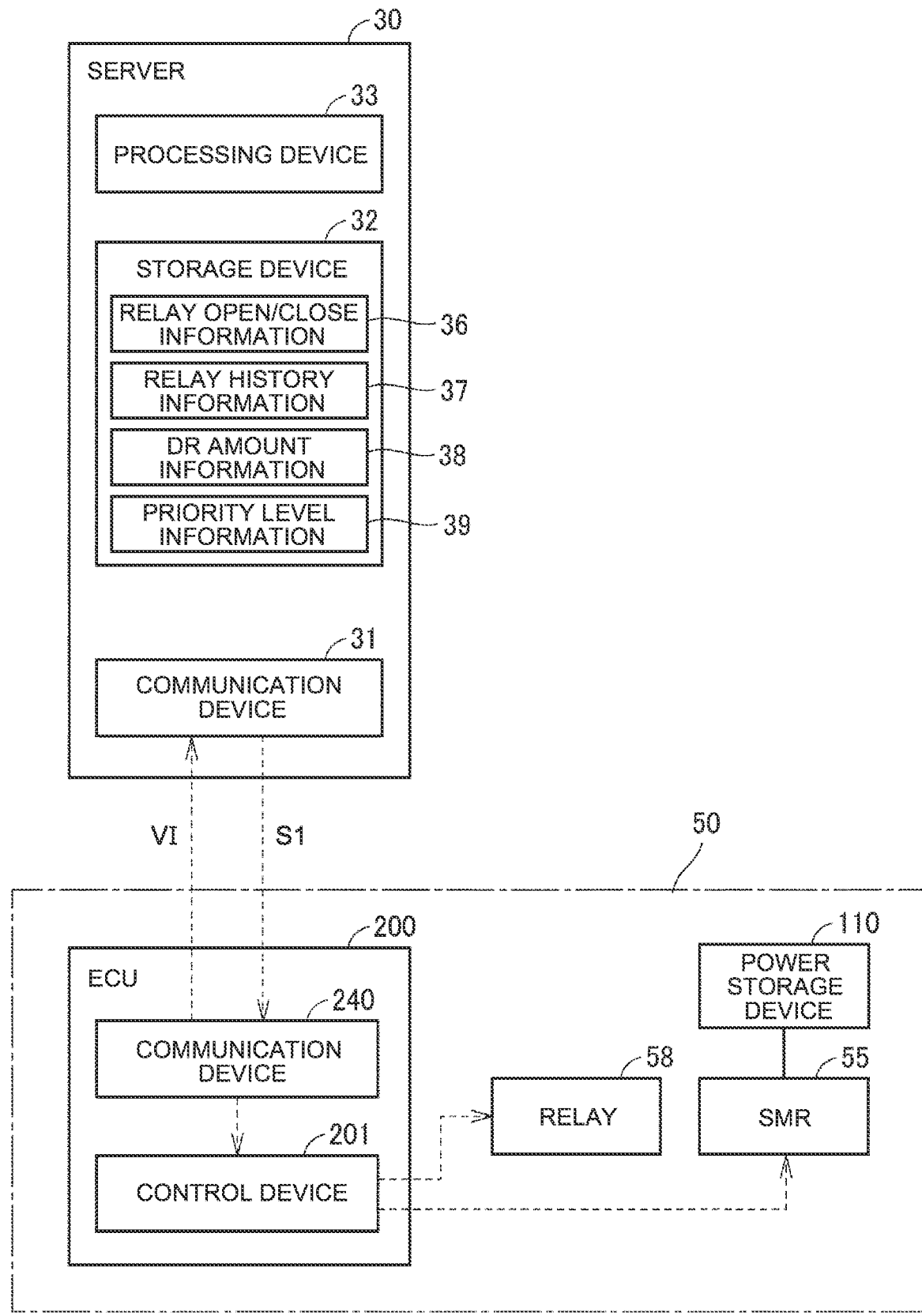
FIG. 4 is a diagram for explaining specific processes by a processing device of a server and an electronic control unit (ECU) of the vehicle.

FIG. 4 is a diagram for explaining specific processes by the processing device 33 of the server 30 and the ECU 200 of the vehicle 50.

Referring to FIG. 4, the control device 201 of the ECU 200 sequentially transmits the vehicle information VI to the server 30 in response to the reception of the demand-increasing DR signal S1 from the server 30 through the communication device 240. The vehicle information VI includes the ID of the vehicle 50, SOC information of the power storage device 110, and a travel schedule of the vehicle 50 (including a scheduled departure time). The vehicle information VI further includes the participation permission information and information indicating the open/close states of the SMR 55 and the charging relay 58.

When the processing device 33 of the server 30 receives the vehicle information VI through the communication device 31, the processing device 33 stores the information indicating the open/close states of the SMR 55 and the charging relay 58 in the storage device 32 as relay open/close information 36 out of the vehicle information VI of the vehicle 50 available for the demand-increasing DR. The vehicle 50 available for the demand-increasing DR is determined by the processing device 33 based on the participation permission information included in the vehicle information VI.

The processing device 33 calculates a DR amount of the vehicle 50 available for the demand-increasing DR based on the SOC information included in the vehicle information VI of the vehicle 50. The processing device 33 calculates the DR amount by, for example, calculating a difference between a current SOC and the full charge SOC of the power storage device 110. The processing device 33 stores a DR amount calculation result in the storage device 32 as DR amount information 38.

The processing device 33 sets a priority level of the vehicle 50 based on the relay open/close information 36 and stores a setting result in the storage device 32 as priority level information 39.

The storage device 32 stores a history of the open/close states of the SMR 55 and the charging relay 58 (that is, a history of the relay open/close information 36) as history information 37. The history information 37 may include information indicating the counts of switching of the open/close states of the SMR 55 and the charging relay 58. The history information 37 will be described later in detail.

The relay open/close information 36, the DR amount information 38, and the priority level information 39 will be described in detail below.

Figures 5, 6:
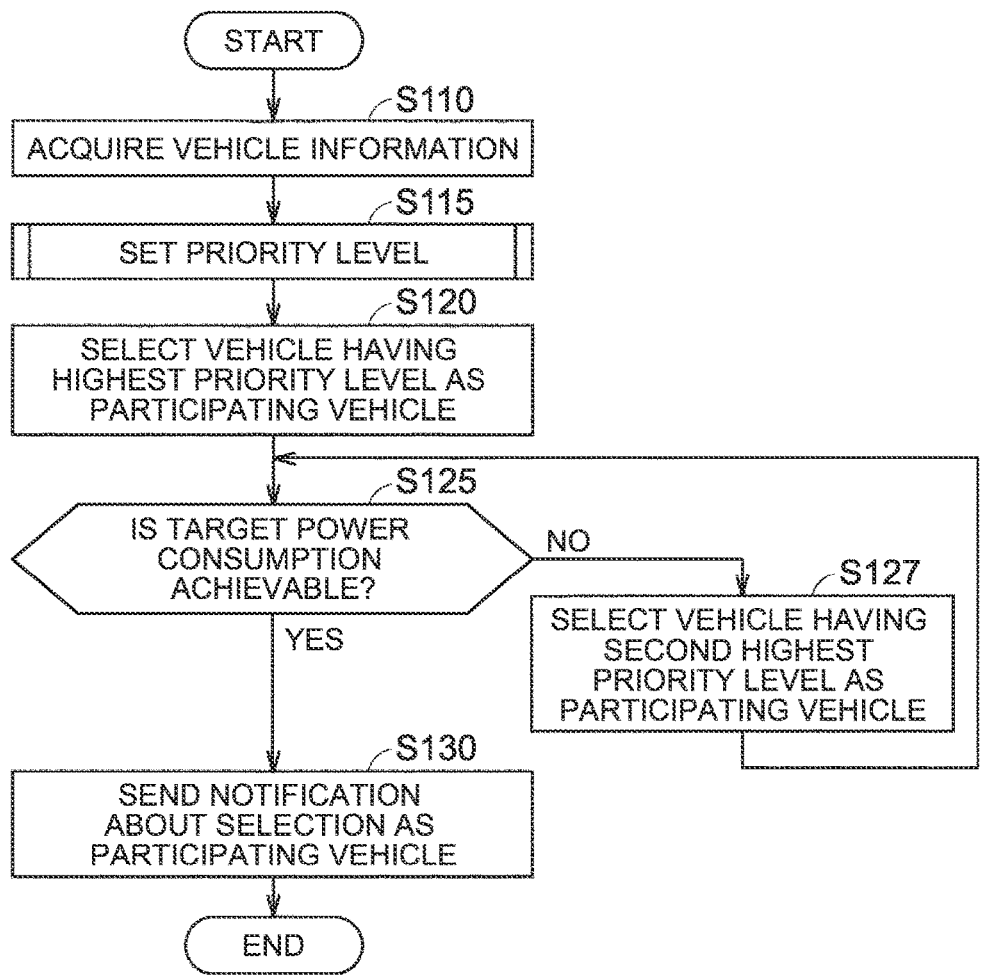
FIG. 5 is a diagram showing an example of vehicle management data stored in a storage device of the server.
FIG. 6 is a flowchart showing an example of a process to be executed by the server according to the first embodiment.

FIG. 5 is a diagram showing an example of management data of the vehicles 50 stored in the storage device 32 of the server 30. Referring to FIG. 5, management data 34 includes ID information 35, the relay open/close information 36, the DR amount information 38, and the priority level information 39.

The ID information 35 indicates vehicle IDs assigned to the vehicles 50 that can participate in the DR. The vehicle ID is information for identifying the vehicle 50. In this example, information on vehicles 50 having IDs "001" to "004" is shown as the management data 34, but information on other vehicles 50 may be included in the management data 34.

The relay open/close information 36 includes SMR information 362 and charging relay information 363. The SMR information 362 indicates the open/close state (ON/OFF state) of the SMR 55 for each vehicle 50.

The charging relay information 363 indicates the open/close state of the charging relay 58 for each vehicle 50. In this example, the charging relays 58 of the vehicles 50 having the IDs "001" to "003" are closed. These vehicles 50 correspond to the vehicles 50A (FIG. 1). The charging relay 58 of the vehicle 50 having the ID "004" is open. This vehicle 50 corresponds to the vehicle 50B (FIG. 1). In the following description, it is assumed that the open/close state of the SMR 55 and the open/close state of the charging relay 58 are the same for simplification of the description.

The DR amount information 38 indicates the DR amount allocated to each vehicle 50. In the following description, it is assumed that the DR amounts of the vehicles 50 are equal (a=b=c=d in this example) for simplification of the description.

The priority level information 39 indicates a priority level p set for each vehicle 50. The priority level p of the vehicle 50 whose charging relay 58 is closed (for example, pa, pb, or pc) is set higher than the priority level p of the vehicle 50 whose charging relay 58 is open (for example, pd) (pa, pb, pc>pd). As the priority level p of the vehicle 50 increases, the vehicle 50 is more likely to be selected as the participating vehicle. When the priority level p is sufficiently low (for example, 0), the vehicle 50 having that priority level p is excluded from candidates for the participating vehicle.

FIG. 6 is a flowchart showing an example of a process to be executed by the server 30 according to the first embodiment. The process in this flowchart is started when the server 30 receives the request R1 (FIG. 1) from the server 20 of the parent AG. In the following description, FIG. 5 will be referred to as appropriate.

Referring to FIG. 6, the server 30 (more specifically, the processing device 33) acquires the vehicle information VI from each of the vehicles 50 in the vehicle group 5 (Step S110).

Next, the server 30 sets the priority level p of each of the vehicles 50 based on the vehicle information VI (Step S115). Details of this process will be described later.

Next, the server 30 selects the vehicle 50 having the highest priority level p among the vehicles 50 as the participating vehicle (Step S120). In this example, it is assumed that the vehicles 50 include the vehicles 50 having the IDs "001" to "004" (FIG. 5). It is also assumed that the priority levels pa, pb, and pc that are the priority levels p of the vehicles 50 having the IDs "001" to "003" are equal and highest (pa=pb=pc>pd). Therefore, the server 30 selects the three vehicles 50 having the IDs "001" to "003" as the participating vehicles in this step.

Then, the server 30 determines whether the target power consumption is achievable based on the information IEC included in the request R1 (Step S125). Specifically, the server 30 determines whether the total DR amount of the vehicles 50 selected as the participating vehicles achieves the target power consumption. The total DR amount achieves the target power consumption when the total equals the consumption or is within a threshold range from the consumption. The threshold range is predetermined as appropriate so that the power supply and demand balance is substantially maintained when the total is within the threshold range.

When the target power consumption is not achievable (NO in Step S125), the server 30 selects, as the participating vehicle, the vehicle 50 having the second highest priority level p after the vehicle 50 already selected as the participating vehicle (that is, the vehicle 50 having the highest priority level p among the remaining vehicles 50) (Step S127). After Step S127, the process returns to Step S125. When the target power consumption is achievable (YES in Step S125), the server 30 advances the process to Step S130.

Next, the server 30 notifies the user of each vehicle 50 selected as the participating vehicle that the user's vehicle 50 has been selected as the participating vehicle (Step S130). For example, the server 30 transmits a request through the communication device 31 to each vehicle 50 selected as the participating vehicle. This request is a signal for requesting the vehicle 50 to cause the HMI device 60 to make the above notification. When the demand-increasing DR period has come, each vehicle 50 contributes to the demand-increasing DR by performing the external charging.

Figure 7:
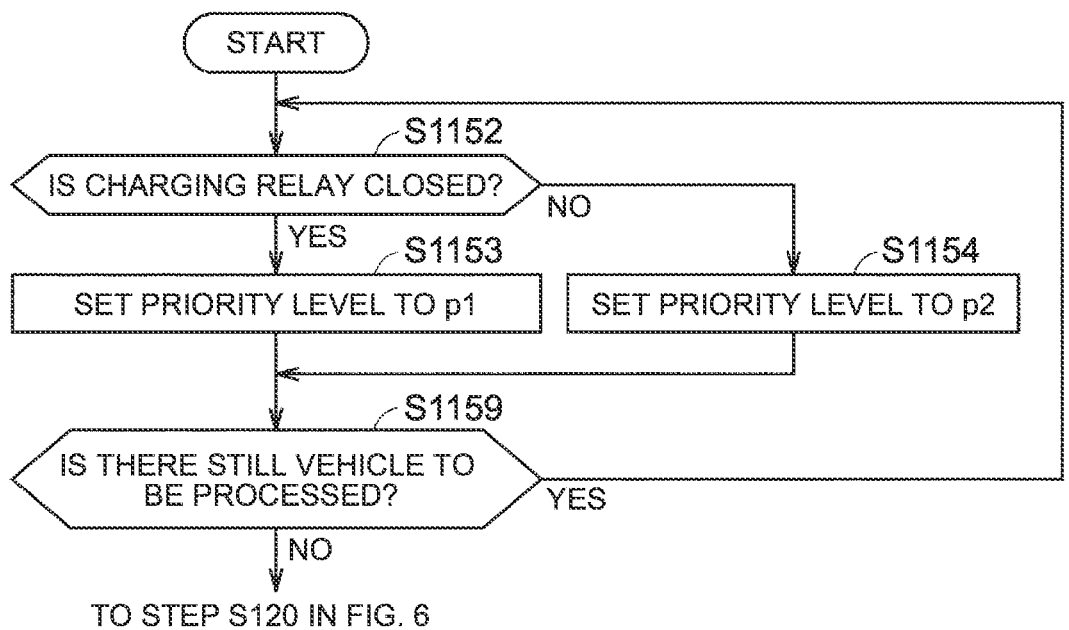
FIG. 7 is a flowchart showing details of an example of a priority level setting process (Step S115 in FIG. 6)

FIG. 7 is a flowchart showing details of an example of a process for setting the priority level p (Step S115 in FIG. 6).

Referring to FIG. 7, the server 30 determines whether charging relay 58 of the vehicle 50 to be processed is closed based on the relay open/close information 36 (FIG. 5) of the vehicle 50 in the management data 34 (Step S1152). The vehicle 50 to be processed is one of the vehicles 50 in the vehicle group 5 that is available for the demand-increasing DR during the demand-increasing DR period specified in the signal S1.

When the charging relay 58 is closed (YES in Step S1152), the server 30 sets the priority level p of the vehicle 50 to be processed to p1 (Step S1153). When the charging relay 58 is open (NO in Step S1152), the server 30 sets the priority level p of the vehicle 50 to be processed to p2 (<p1) (Step S1154).

Next, the server 30 determines whether there is still a vehicle 50 to be processed, that is, whether there is a vehicle 50 for which the processes of Steps 51152 to S1154 have not been executed yet (Step S1159). When there is still a vehicle 50 to be processed (YES in Step S1159), the server 30 returns the process to Step S1152. When there is no vehicle 50 to be processed (NO in Step S1159), the server 30 advances the process to Step S120 in FIG. 6.

In the first embodiment, the V1G vehicle is used as the vehicle 50. Therefore, in the power management system 1, it is possible to suppress the wear of the charging relay 58 and adjust the power supply and demand balance while simplifying the configuration and control of the vehicle 50.

Second Embodiment

The processing device 33 of the server 30 may set the priority level p of each of the vehicles 50A based on a history of the closed state duration of the vehicle 50A. The closed state duration is a period during which the charging relay 58 remains closed.

The history of the closed state duration reflects the frequency of switching of the open/close state of the charging relay 58. When the priority level p is set as described above, the history of the closed state duration is reflected in the priority level p for each of the vehicles 50A. Therefore, the frequency of switching of the open/close state of the charging relay 58 is reflected in the priority level p for each of the vehicles 50A. As a result, the participating vehicle can appropriately be selected from the viewpoint of suppressing the wear of the charging relay 58.

The configuration of the power management system according to the second embodiment is the same as the configuration of the power management system 1 according to the first embodiment.

Figure 8:
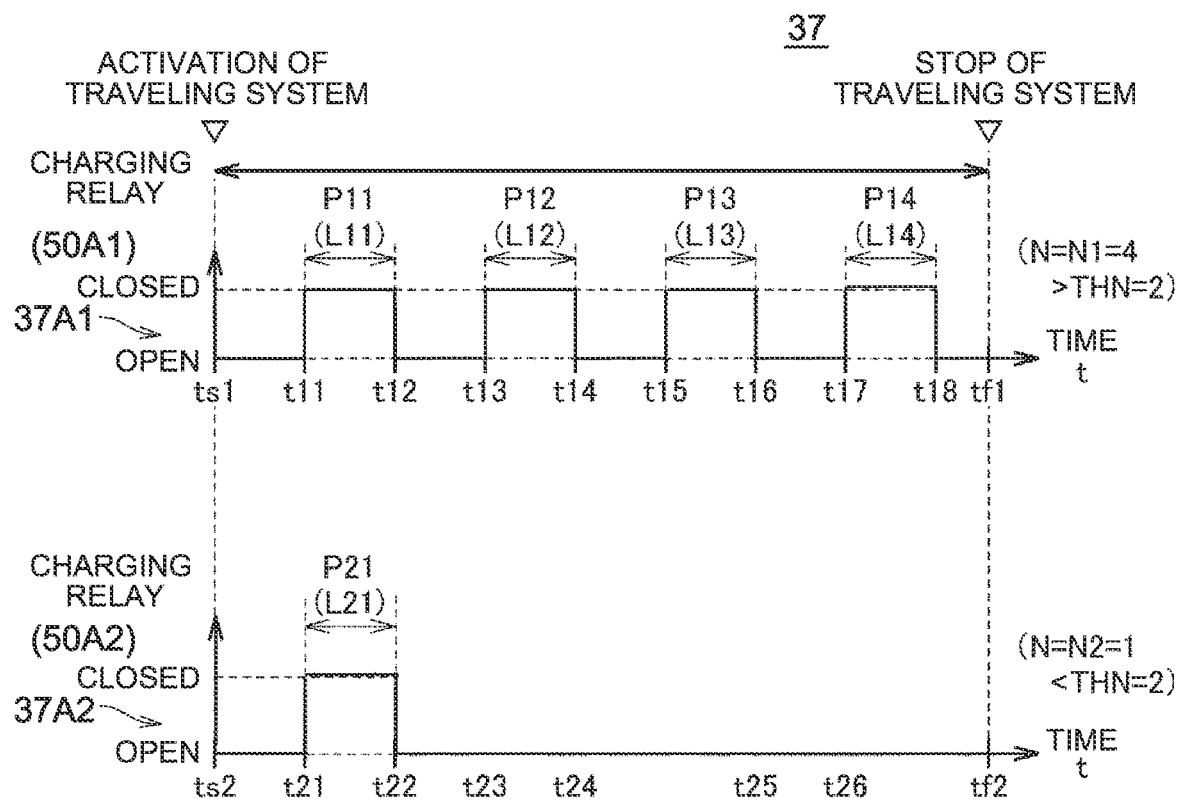
FIG. 8 is a diagram showing details of history information during the nearest period.

FIG. 8 is a diagram showing details of the history information 37 during the nearest period. The nearest period is, for example, a period from a current time to a time earlier by a predetermined period (for example, 24 hours). This example shows a history of the open/close state of the charging relay 58 from a time when the traveling system of the vehicle 50A has been activated to a time when the traveling system has been stopped during the nearest period.

Referring to FIG. 8, the history information 37 includes pieces of data 37A1 and 37A2. The pieces of data 37A1 and 37A2 indicate histories of the open/close states of the charging relays 58 of vehicles 50A1 and 50A2 during the nearest period, respectively. Each of the vehicles 50A1 and 50A2 is one of the vehicles 50A.

In this example, it is assumed that the vehicles 50A1 and 50A2 have performed the external charging during a period in which the charging relays 58 of the vehicles 50A1 and 50A2 are closed. The external charging of the vehicles 50A1 and 50A2 is not performed during a period in which the charging relays 58 are open.

The data 37A1 indicates that the charging relay 58 of the vehicle 50A1 has been controlled to be closed (ON state) during a period P11 (time t11 to time t12), a period P12 (time t13 to time t14), a period P13 (time t15 to time t16), and a period P14 (time t17 to time t18). The data 37A1 indicates that the charging relay 58 of the vehicle 50A1 has been controlled to be opened (OFF state) during periods different from these periods. The data 37A1 includes a count N1 (four in this example) of the external charging of the vehicle 50A1 during the nearest period.

The data 37A2 indicates that the charging relay 58 of the vehicle 50A2 has been controlled to be closed during a period P21 (time t21 to time t22). The data 37A2 indicates that the charging relay 58 of the vehicle 50A2 has been controlled to be opened during periods different from this period. The data 37A2 includes a count N2 (one in this example) of the external charging of the vehicle 50A2 during the nearest period.

Each of the counts N1 and N2 (N1>N2) is an example of a count N of the external charging of the vehicle 50A during the nearest period. The count N is used as an example of an index value indicating the frequency of the external charging of the vehicle 50A.

Times L11 to L14 and L21 are the lengths of the periods P11 to P14 and P21, respectively, and are the closed state durations during which the charging relay 58 remains closed. The closed state durations of the vehicles 50A1 and 50A2 are calculated by the processing device 33. These closed state durations are stored in the storage device 32 as part of the pieces of data 37A1 and 37A2. It is also conceivable that the frequency of the external charging increases and the charging relay 58 is more likely to be worn as the closed state duration decreases and the count of switching of the charging relay 58 increases. Therefore, a value indicating the degree of shortness of the closed state duration when the external charging is performed (for example, the reciprocal of an average value of the closed state durations when the external charging is performed during the nearest period) may be used as the index value. Thus, the history information 37 includes the history of the closed state duration for each of the vehicles 50A.

Among the vehicles 50A, the processing device 33 sets the priority level p of the vehicle 50A1 having a high index value to be higher than the priority level p of the vehicle 50A2 having a low index value. In this example, the processing device 33 sets the priority level p of the vehicle 50A1 whose count N is larger than a threshold count THN (for example, two) to be higher than the priority level p of the vehicle 50A2 whose count N is smaller than the threshold count THN.

The charging relay 58 of the vehicle 50A1 with the large count N is controlled to be closed more frequently than the charging relay 58 of the vehicle 50A2 with the small count N. Therefore, the charging relay 58 of the vehicle 50A1 is likely to be switched more frequently than the charging relay 58 of the vehicle 50A2. Thus, it is conceivable that the charging relay 58 of the vehicle 50A1 is likely to be worn. When the priority levels p are set as described above, the vehicle 50A1 is selected as the participating vehicle with priority over the vehicle 50A2. Accordingly, the vehicle 50A1 is more likely to be used for the demand-increasing DR than the vehicle 50A2. During a period in which the vehicle 50A1 is used for the demand-increasing DR, the charging relay 58 of the vehicle 50A1 is kept closed. As a result, the situation in which the charging relay 58 of the vehicle 50A1 is switched during this period is avoided. Therefore, the wear of the charging relay 58 of the vehicle 50A1 can be suppressed.

Figure 9:
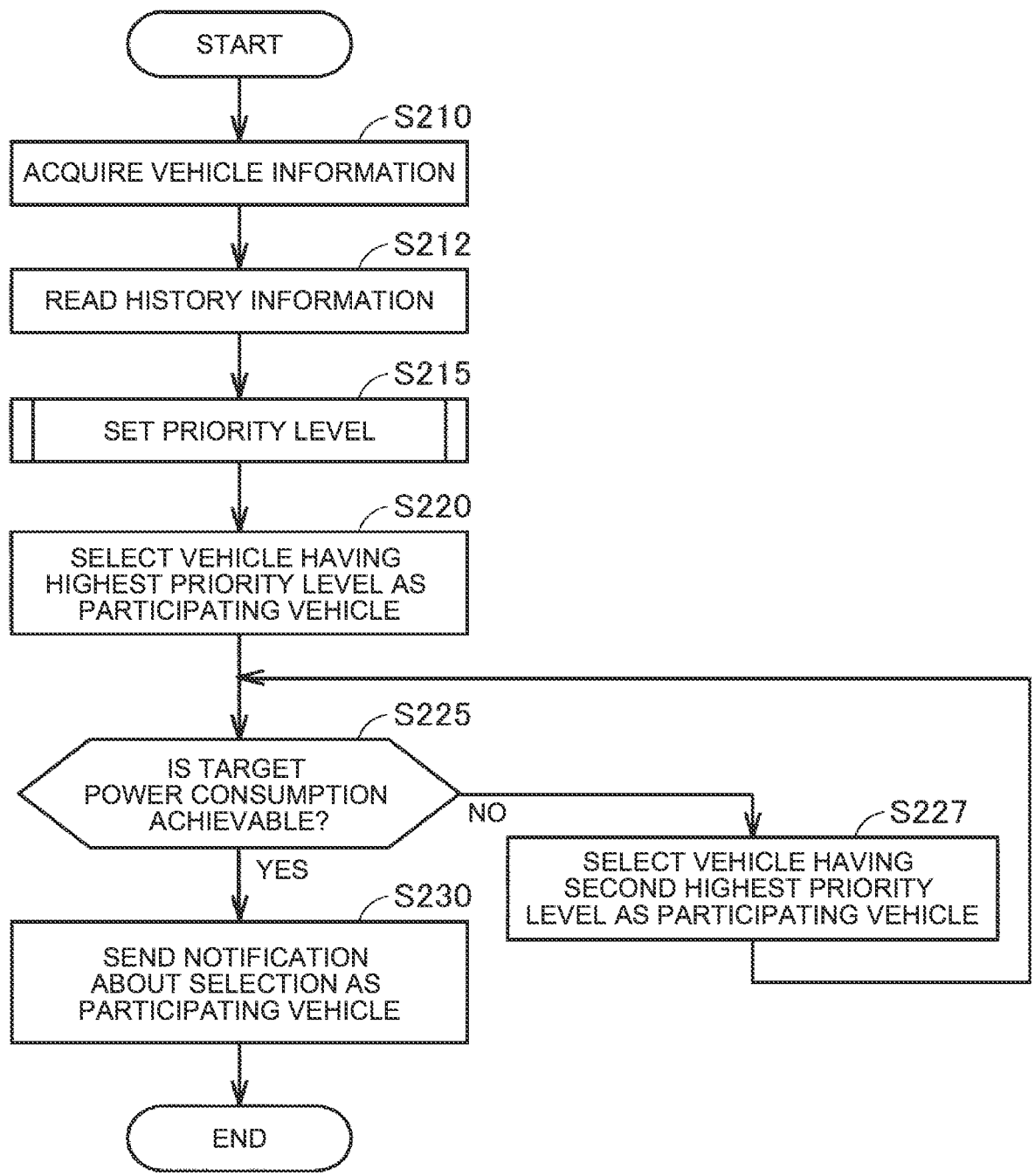
FIG. 9 is a flowchart showing an example of a process to be executed by the server according to a second embodiment.

FIG. 9 is a flowchart showing an example of a process to be executed by the server 30 according to the second embodiment. The process in this flowchart is started when the server 30 receives the request R1 (FIG. 1) from the server 20 of the parent AG.

Referring to FIG. 9, this flowchart differs from the flowchart of FIG. 6 in that a process of Step S212 is added. Processes of Steps S210 and S220 to S230 are the same as the processes of Steps S110 and S120 to S130 (FIG. 6), respectively.

When the server 30 acquires the vehicle information VI (Step S210), the server 30 reads the history information 37 (FIG. 8) (Step S212).

Next, the server 30 sets the priority level p of each vehicle 50 based on the vehicle information VI and the history information 37 (Step S215).

FIG. 10 is a flowchart showing details of a process for setting the priority level p (Step S215 in FIG. 9).

Referring to FIG. 10, this flowchart differs from the flowchart of FIG. 7 in that processes of Steps S2155, S2156, S2157A, S2157B, and S2158 are added. Processes of Steps S2152, S2154, and S2159 are the same as the processes of Steps S1152, S1154, and S1159 (FIG. 7), respectively.

When the charging relay 58 of the vehicle 50 to be processed is closed (YES in Step S2152), the vehicle 50 is the vehicle 50A. Then, the server 30 temporarily sets the priority level p of the vehicle 50A to p1 (Step S2153).

Next, the server 30 acquires the count N of the external charging of the vehicle 50A during the nearest period based on the history information 37 (FIG. 8) (Step S2155).

Next, the server 30 determines whether the count N is equal to or larger than the threshold count THN (Step S2156). When the count N is equal to or larger than the threshold count THN (YES in Step S2156), the server 30 sets the correction amount of the priority level p to a correction amount CA1 (Step S2157A). When the count N is smaller than the threshold count THN (NO in Step S2156), the server 30 sets the correction amount of the priority level p to a correction amount CA2 (<CA1) (Step S2157B).

Next, the server 30 sets the priority level p by correcting the priority level p based on the correction amount set in Step S2157A or Step S2157B (Step S2158). Specifically, the server 30 sets the priority level p by adding the correction amount CA1 or the correction amount CA2 to p1 (p=p1+CA1 or p=p1+CA2). For example, the priority level p of the vehicle 50A1 (FIG. 8) is set to p1+CA1 (>p2). The priority level p of the vehicle 50A2 is set to p1+CA2 (>p2). That is, the priority level p of the vehicle 50A1 is set higher than the priority level p of the vehicle 50A2.

The priority level p set in this way is used for selecting the participating vehicle (Step S220 in FIG. 9). Therefore, for example, the vehicle 50A1 is more likely to be selected as the participating vehicle with priority over the vehicle 50A2.

First Modification of Second Embodiment

The target power consumption included in the information IEC (FIG. 1) that the server 30 receives from the server 20 of the parent AG may change (for example, decrease) from the target power consumption that the server 30 has originally received from the server 20. In this case, the server 30 may need to select (for example, 30) vehicles 50 to be excluded from the participating vehicles after selecting (for example, 100) participating vehicles from among the vehicles 50.

Therefore, the server 30 (more specifically, the processing device 33) may select an excluded vehicle that is a vehicle 50 to be excluded from the participating vehicles after selecting the participating vehicles from among the vehicles 50. In this case, the server 30 selects the vehicle 50A2 as the excluded vehicle with priority over the vehicle 50A1 from among the vehicles 50A. The server 30 selects the excluded vehicle after the transmission of the demand-increasing DR signal S1 to the vehicles 50 and before the start of a target demand-increasing DR period. The server 30 may give a notification that the vehicle 50 has been selected as the excluded vehicle by, for example, transmitting an exclusion notification signal (not shown) to the vehicle 50 selected as the excluded vehicle.

As described above, the charging relay 58 of the vehicle 50A1 is likely to be switched more frequently than the charging relay 58 of the vehicle 50A2. Thus, it is conceivable that the charging relay 58 of the vehicle 50A1 is likely to be worn. When the excluded vehicle is selected as described above, the vehicle 50A2 is excluded from the participating vehicles with priority over the vehicle 50A1, while the vehicle 50A1 is less likely to be excluded from the participating vehicles than the vehicle 50A2. During a period in which the vehicle 50A1 participates in the demand-increasing DR, the charging relay 58 of the vehicle 50A1 is kept closed. As a result, the situation in which the charging relay 58 of the vehicle 50A1 is switched during this period is avoided. Therefore, the wear of the charging relay 58 of the vehicle 50A1 can be suppressed, and the wear of the charging relays 58 in the entire power management system 1 can be suppressed.

In the above, the vehicle 50A2 is excluded from the participating vehicles with priority over the vehicle 50A1. Even though the use of the vehicle 50A2 for the demand-increasing DR is canceled, the charging relay 58 of the vehicle 50A2 is less likely to be worn because of a low frequency of switching of the charging relay 58 of the vehicle 50A2. Thus, practical problems are unlikely to occur from the viewpoint of protection of the charging relay 58 of the vehicle 50A2.

Second Modification of Second Embodiment

The history of the closed state duration indicated by the history information 37 may include a participation frequency index value indicating the frequency of use of each of the vehicles 50 for the demand-increasing DR.

Referring again to FIG. 8, in the second modification, the history also includes information indicating whether the vehicle 50A1 has been used for the demand-increasing DR in each of the periods P11 to P14, and whether the vehicle 50A2 has been used for the demand-increasing DR in the period P21.

The server 30 can determine, by using the DR information stored in the storage device 32, whether the period during which the charging relay 58 of the vehicle 50A has remained closed (for example, the periods P11 to P14) is the period during which the vehicle 50A has been used for the demand-increasing DR.

For example, when the period during which the charging relay 58 of the vehicle 50A has remained closed (first period) is equal to a DR period (second period) indicated by the DR information of the vehicle 50A, the server 30 determines that the vehicle 50A has been used for the demand-increasing DR during the first period. When the first period is different from the second period, the server 30 determines that the vehicle 50A has not been used for the demand-increasing DR during the first period.

In this example, it is assumed, for simplification of the description, that the vehicle 50A1 has been used for the demand-increasing DR in each of the periods P11 to P14 and the vehicle 50A2 has been used for the demand-increasing DR in the period P21. Therefore, the count of use of the vehicle 50A1 for the demand-increasing DR during the nearest period is the count N1. The count N1 can be used as an example of the participation frequency index value of the vehicle 50A1. Similarly, the count of use of the vehicle 50A2 for the demand-increasing DR during the nearest period is the count N2. The count N2 can be used as an example of the participation frequency index value of the vehicle 50A2. In this example, the vehicle 50A1 is used for the demand-increasing DR more frequently than the vehicle 50A2 during the nearest period because the count N1 is larger than the count N2.

In the second modification, among the vehicles 50A, the processing device 33 sets the priority level p of the vehicle 50A1 having a high participation frequency index value to be lower than the priority level p of the vehicle 50A2 having a low participation frequency index value.

It is conceivable that the vehicle 50A1 having the high participation frequency index value is likely to be used for the demand-increasing DR more frequently than the vehicle 50A2 having the low participation frequency index value. Therefore, it is conceivable that, during the nearest period (for example, during a period from a time ts1 to a time to in FIG. 8), the current from the power grid PG is more likely to flow through the charging relay 58 of the vehicle 50A1 than through the charging relay 58 of the vehicle 50A2. As a result, it is conceivable that the charging relay 58 of the vehicle 50A1 is more likely to be worn (deteriorated) than the charging relay 58 of the vehicle 50A2. It is conceivable that, when the vehicle 50A1 is not used for the demand-increasing DR during the above period, the charging relay 58 of the vehicle 50A1 is less likely to be worn than when the vehicle 50A1 is used for the demand-increasing DR during the period (data 37A1 in FIG. 8).

When the priority level p of the vehicle 50A1 is set lower than the priority level p of the vehicle 50A2, the vehicle 50A1 is less likely to be selected as the participating vehicle than the vehicle 50A2. Accordingly, the vehicle 50A1 is less likely to be used for the demand-increasing DR than the vehicle 50A2. When the vehicle 50A1 is not used for the demand-increasing DR, the current caused by the use of the vehicle 50A1 for the demand-increasing DR, that is, the current from the power grid PG to the charging relay 58 through the inlet 59 does not flow like the case where the vehicle 50A1 is used for the demand-increasing DR. Therefore, when the priority levels p are set as described above, the frequent use of the vehicle 50A1 for the demand-increasing DR can be prevented. Thus, the further wear of the charging relay 58 due to the frequent use of the vehicle 50A1 for the demand-increasing DR can be suppressed.

In the second embodiment and its first modification, it is assumed that the charging relay 58 of the vehicle 50A1 is likely to be switched more frequently than the charging relay 58 of the vehicle 50A2 during periods different from the demand-increasing DR period. That is, it is assumed that the charging relay 58 of the vehicle 50A1 is more likely to be worn than the charging relay 58 of the vehicle 50A2. The second modification is particularly effective when the frequency of switching of the charging relay 58 of the vehicle 50A1 is approximately the same as the frequency of switching of the charging relay 58 of the vehicle 50A2 during the periods different from the demand-increasing DR period. For example, the second modification is particularly effective when both the charging relays 58 are less likely to be worn because both the switching frequencies are low during these periods.

Third Embodiment

When a certain vehicle among the vehicles 50 satisfies a predetermined condition, the processing device 33 of the server 30 may set the priority level p of this vehicle 50 (also referred to as "condition-satisfying vehicle") (for example, to 0) to exclude the condition-satisfying vehicle from the candidates for the participating vehicle. As described above, when the priority level p is 0, the vehicle 50 having that priority level p is excluded from the candidates for the participating vehicle.

In this example, it is assumed that the predetermined condition is that the scheduled departure time of the vehicle 50 is within a period during which the demand-increasing DR is implemented (also referred to as "demand-increasing DR implementation period"). That is, it is assumed that the scheduled departure time of the condition-satisfying vehicle is within the demand-increasing DR implementation period.

The configuration of the power management system according to the third embodiment is the same as the configuration of the power management system 1 according to the first embodiment. The processing procedure of the server 30 in the third embodiment is basically the same as the processing procedure shown in FIG. 6.

FIG. 11 is a diagram for explaining that user's inconvenience is caused when the scheduled departure time of the vehicle 50 is within the demand-increasing DR implementation period.

Referring to FIG. 11, a time tN is a current time. A scheduled departure time tD is the scheduled departure time of the vehicle 50. A time tD1 is the scheduled departure time tD of the condition-satisfying vehicle. A demand-increasing DR implementation period DRPR is a period from a time tDRS after the time tN to a time tDRE.

When the condition-satisfying vehicle is selected as the participating vehicle at the time tN, the condition-satisfying vehicle is requested for use in the DR over the demand-increasing DR implementation period DRPR. As a result, there is a possibility that the condition-satisfying vehicle cannot depart at the time tD1 because the condition-satisfying vehicle is requested for connection to the power equipment 40 during the demand-increasing DR implementation period DRPR.

In this example, the processing device 33 selects a vehicle 50 whose scheduled departure time tD is set to a time after the demand-increasing DR implementation period DRPR (for example, a time tD2) as the participating vehicle instead of the condition-satisfying vehicle. When this vehicle 50 is selected as the participating vehicle at the time tN, the vehicle 50 can depart at the scheduled departure time (time tD2) while being used for the demand-increasing DR during the demand-increasing DR implementation period DRPR.

As described above, when the priority level p of the condition-satisfying vehicle is set to exclude the condition-satisfying vehicle from the candidates for the participating vehicle, the situation in which the condition-satisfying vehicle is selected as the participating vehicle is avoided. As a result, it is possible to reduce the occurrence of a case where the condition-satisfying vehicle is requested for use in the demand-increasing DR and cannot depart at the time tD1. Thus, it is possible to suppress the wear of the charging relays 58 of the vehicles 50 and adjust the power supply and demand balance without causing any inconvenience to the user of the condition-satisfying vehicle.

FIG. 12 is a diagram showing another example of the management data of the vehicles 50 stored in the storage device 32. Referring to FIG. 12, the management data 34 includes predetermined condition information 41 in addition to the ID information 35, the relay open/close information 36, the DR amount information 38, and the priority level information 39.

The ID information 35, the relay open/close information 36, and the DR amount information 38 are the same as those described in FIG. 5.

The predetermined condition information 41 indicates whether the vehicle 50 satisfies the predetermined condition. In this example, the predetermined condition is that the scheduled departure time tD is within the demand-increasing DR implementation period DRPR. The vehicles 50 having the IDs "001", "002", and "004" do not satisfy the predetermined condition, while the vehicle 50 having the ID "003" satisfies the predetermined condition.

The predetermined condition information 41 is related to the priority level information 39. Specifically, the priority level p of the vehicle 50 that satisfies the predetermined condition (in this example, the vehicle 50 having the ID "003") is set to 0 to exclude the vehicle 50 from the candidates for the participating vehicle. The priority levels p of the other vehicles 50 are set in the same manner as in the first embodiment (FIG. 5). That is, pa, pb>pd>pc=0 in this example.

FIG. 13 is a flowchart showing details of another example of the process for setting the priority level p (Step S115 in FIG. 6).

Referring to FIG. 13, this flowchart differs from the flowchart of FIG. 7 in that processes of Steps S1150 and S1151 are added. The processes of Steps S1152, S1153, S1154, and S1159 are the same as the processes described in FIG. 7.

The server 30 determines whether the vehicle 50 to be processed satisfies the predetermined condition based on the predetermined condition information 41 (FIG. 12) of the vehicle 50 in the management data 34 (Step S1150). In this example, the predetermined condition is that the scheduled departure time tD of the vehicle 50 is within the demand-increasing DR implementation period DRPR (FIG. 11).

When the predetermined condition is not satisfied (NO in Step S1150), the server 30 advances the process to Step S1152. When the predetermined condition is satisfied (YES in Step S1150), the server 30 sets the priority level p of the vehicle 50 to be processed to 0 (Step S1151). Then, the process proceeds to Step S1159.

Modification of Third Embodiment

The predetermined condition may be that the count of switching of the charging relay 58 is equal to or larger than the threshold switching count.

As described above, the history information 37 may include the information indicating the count of switching of the open/close state of the charging relay 58. When the open/close state of the charging relay 58 is switched from one of the open state and the closed state to the other, the count of switching of the charging relay 58 increases by one in the history information 37. The processing device 33 determines the switching of the open/close state of the charging relay 58 based on the relay open/close information 36 and executes the increasing process.

The processing device 33 acquires the count of switching of the charging relay 58 from the history information 37, and determines whether the switching count is equal to or larger than the threshold switching count. The processing device 33 may acquire the count of switching of the charging relay 58 in a predetermined period from the history information 37 and perform the above determination. The predetermined period is, for example, a period from a current time to a time earlier by a predetermined period (for example, 24 hours).

Then, the processing device 33 sets the priority level p (for example, to 0) of the vehicle 50 with the switching count equal to or larger than the threshold switching count (that may be either the vehicle 50A or 50B) to exclude the vehicle 50 from the candidates for the participating vehicle as the condition-satisfying vehicle. The processing device 33 may set the priority level p of the vehicle 50 with a small switching count to be higher than the priority level p of the vehicle 50 with a large switching count.

When the priority levels p are set as described above, the vehicle 50 whose switching count is equal to or larger than the threshold switching count is excluded from the candidates for the participating vehicle. Alternatively, the vehicle 50 with a small switching count is more likely to be selected as the participating vehicle than the vehicle 50 with a large switching count. As a result, it is possible to suppress the use of the vehicle 50 for the DR with a relatively large switching count. Accordingly, it is possible to avoid the further wear of the charging relay 58 of the vehicle 50 with the relatively large switching count.

Other Modifications

The vehicle 50 may be a V2G vehicle configured to perform external discharging in addition to the external charging. In this case, the vehicle 50 includes a power conversion device in place of or in addition to the charging relay 58 (FIG. 3). The ECU 200 may control the start and stop of the external charging by switching the power conversion device ON and OFF in place of or in addition to the control on the open/close state of the charging relay 58.

The power company E1 and the parent AG of the upper aggregator E2 may be the same business operator. In this case, the servers 10 and 20 are managed by the same business operator. Alternatively, the parent AG of the upper aggregator E2 and the child AG of the lower aggregator E3 may be the same business operator. In this case, the servers 20 and 30 are managed by the same business operator.

The embodiments disclosed herein should be considered to be illustrative and not restrictive in all respects. The scope of the present disclosure is shown by the claims rather than the above description, and is intended to include all modifications within the meaning and the scope equivalent to those of the claims.

What is claimed is:

1. A server configured to manage a plurality of vehicles, each of the vehicles including a power storage device and a switching device openable and closable to switch electrical connection between the power storage device and a power grid, each of the vehicles being configured to receive electric power from the power grid through power equipment outside the vehicle when the switching device is in a closed state, the server comprising a processing device configured to:
   acquire, for each of the vehicles, information on whether the switching device is in an open state or the closed state;
   set priority levels for the vehicles, the processing device being configured to set a priority level of a first vehicle in which the switching device is in the closed state among the vehicles to be higher than a priority level of a second vehicle in which the switching device is in the open state among the vehicles;
   select, based on the priority levels, a participating vehicle to be used for demand-increasing demand response for increasing a power load in the power grid from among the vehicles;
   select the vehicle having the highest priority level among the vehicles as the participating vehicle;
   transmit, to the participating vehicle, a signal for notification that the vehicle having the highest priority level has been selected as the participating vehicle;
   acquire a target power consumption;
   determine whether a total demand response (DR) amount of the participating vehicle achieves the target power consumption; and
   in a case where the participating vehicle does not achieve the target power consumption, select a vehicle having the second highest priority level from among the vehicles as the participating vehicle.

2. The server according to claim 1, wherein when a scheduled departure time of a vehicle of the plurality of vehicles is within a period during which electric power is being received from the power grid, the processing device is configured to set the priority level for the vehicle to zero.

3. The server according to claim 1, wherein the processing device is further configured to set the priority levels for each of the plurality of vehicles based on a history of a duration of the switching device for each of the plurality of vehicles, the duration being a period during which the switching device remains in the closed state.

4. The server according to claim 3, wherein:
each of the vehicles is configured to perform external charging in which the power storage device is charged with the electric power received through the power equipment;
the history of the duration includes an index value indicating a frequency of the external charging; and
the processing device is configured to set a priority level of a third vehicle to be higher than a priority level of a fourth vehicle, wherein the index value of the third vehicle is higher than the index value of the fourth.

5. The server according to claim 4, wherein the processing device is configured to exclude the fourth vehicle from being the participating vehicle.

6. The server according to claim 3, wherein:
each of the vehicles is configured to perform external charging in which the power storage device is charged with the electric power received through the power equipment;
the history of the duration includes a participation frequency index value indicating a frequency of use of each of the vehicles for the demand-increasing demand response; and
the processing device is configured to set a priority level of a fifth vehicle to be lower than a priority level of a sixth vehicle, wherein the participation frequency index value of the fifth vehicle is higher than the participation frequency index value of the sixth vehicle.

7. The server according to claim 1, wherein:
each of the vehicles is configured to perform external charging in which the power storage device is charged with the electric power received through the power equipment; and
the processing device is configured to set a priority level of a seventh vehicle to exclude the seventh vehicle from candidates for the participating vehicle when a scheduled departure time of the seventh vehicle is within a period during which the demand-increasing demand response is implemented.

8. The server according to claim 1, wherein:
each of the vehicles is configured to perform external charging in which the power storage device is charged with the electric power received through the power equipment; and the processing device is configured to set a priority level of an eighth vehicle to exclude the eighth vehicle from candidates for the participating vehicle when a switching count of the switching device of the eighth vehicle in a predetermined period is equal to or larger than a predetermined switching count.

9. A power management system comprising:
a plurality of vehicles; and
a server configured to manage the vehicles, wherein:
each of the vehicles includes:
a power storage device; and
a switching device openable and closable to switch electrical connection between the power storage device and a power grid;
each of the vehicles is configured to receive electric power from the power grid through power equipment outside the vehicle when the switching device is in a closed state; and
the server includes a processing device configured to:
acquire, for each of the vehicles, information on whether the switching device is in an open state or the closed state;
set priority levels for the vehicles, the processing device being configured to set a priority level of a first vehicle in which the switching device is in the closed state among the vehicles to be higher than a priority level of a second vehicle in which the switching device is in the open state among the vehicles;
select, based on the priority levels, a participating vehicle to be used for demand-increasing demand response for increasing a power load in the power grid from among the vehicles;
select the vehicle having the highest priority level among the vehicles as the participating vehicle;
transmit, to the participating vehicle, a signal for notification that the vehicle having the highest priority level has been selected as the participating vehicle;
acquire a target power consumption;
determine whether a total demand response (DR) amount of the participating vehicle achieves the target power consumption; and
in a case where the participating vehicle does not achieve the target power consumption, select a vehicle having the second highest priority level from among the vehicles as the participating vehicle.

10. The power management system according to claim 9, wherein each of the vehicles is configured to only perform external charging in which the power storage device is charged with the electric power received through the power equipment.

* * * * *